Figure 1:
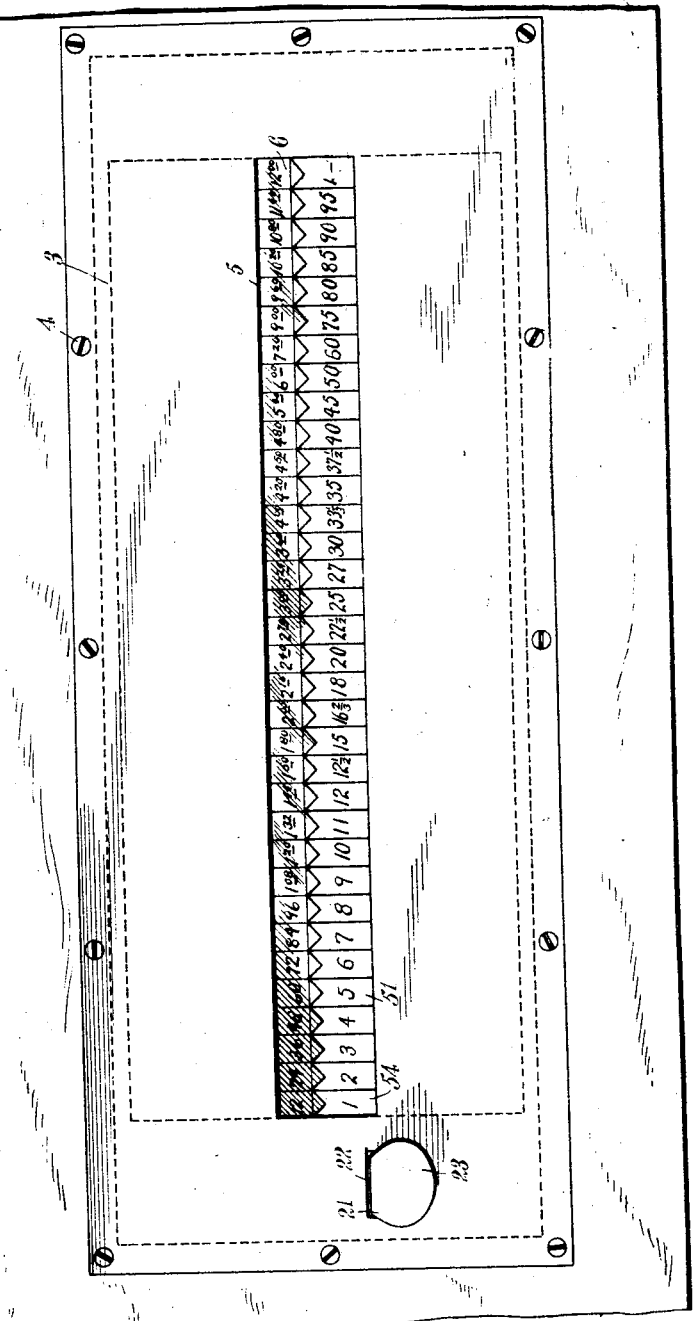

R. H. SHEPPE, H. H. EATON & C. D. ALLEN.
A. L. SHEPPE, ADMINISTRATRIX OF R. H. SHEPPE, DEC'D.
AUTOMATIC CLOTH MEASURING AND PRICE CALCULATING MACHINE.
APPLICATION FILED FEB. 25, 1910.

997,942.

Patented July 11, 1911.
3 SHEETS—SHEET 1.

WITNESSES:
G. Robert Thomas
H. Whiting

INVENTORS
Robert H. Sheppe
Hugh H. Eaton
Clifford D. Allen
BY
Munn & Co.
ATTORNEYS R. H. SHEPPE, H. H. EATON & C. D. ALLEN.
A. L. SHEPPE, ADMINISTRATRIX OF R. H. SHEPPE, DEC'D.
AUTOMATIC CLOTH MEASURING AND PRICE CALCULATING MACHINE.
APPLICATION FILED FEB. 25, 1910.

997,942.

Patented July 11, 1911.

3 SHEETS—SHEET 2.

INVENTORS
Robert H. Sheppe
Hugh H. Eaton
Clifford D. Allen
BY
*(signature)*
ATTORNEYS WITNESSES:
G. Robert Thomas
H. Whiting R. H. SHEPPE, H. H. EATON & C. D. ALLEN.
A. L. SHEPPE, ADMINISTRATRIX OF R. H. SHEPPE, DEC'D.
AUTOMATIC CLOTH MEASURING AND PRICE CALCULATING MACHINE.
APPLICATION FILED FEB. 25, 1910.
997,942.
Patented July 11, 1911.
3 SHEETS—SHEET 3.
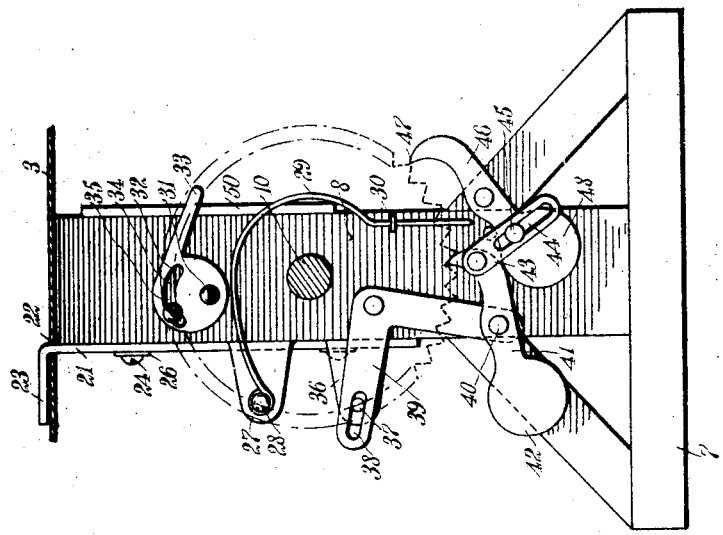
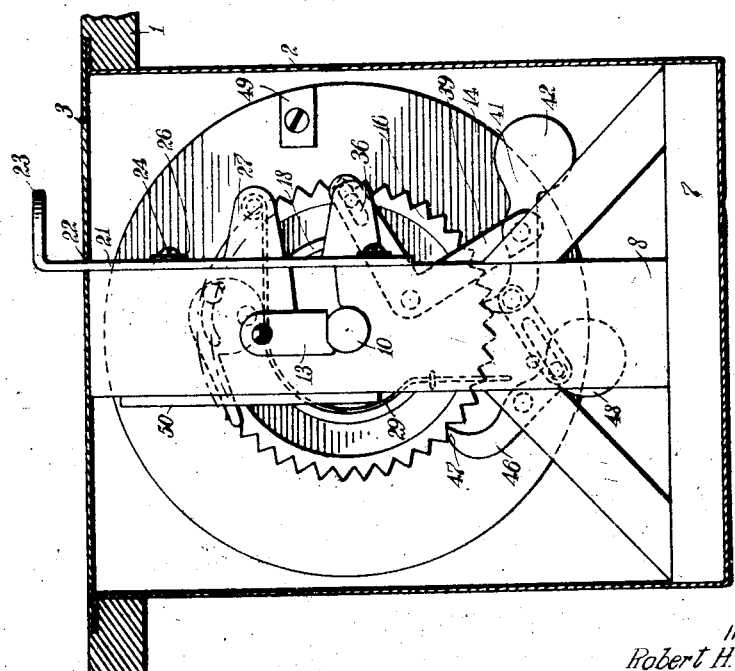
WITNESSES:
G. Robert Thomas
H. Whiting
INVENTORS
Robert H. Sheppe
Hugh H. Eaton
Clifford D. Allen
BY
ATTORNEYS

UNITED STATES PATENT OFFICE.

ROBERT H. SHEPPE, OF BIG STONE GAP, HUGH H. EATON, OF BRISTOL, AND CLIFFORD D. ALLEN, OF MEADOWVIEW, VIRGINIA; A. L. SHEPPE ADMINISTRATRIX OF SAID ROBERT H. SHEPPE, DECEASED.

AUTOMATIC CLOTH-MEASURING AND PRICE-CALCULATING MACHINE.

997,942. Specification of Letters Patent. Patented July 11, 1911.

Application filed February 25, 1910. Serial No. 545,819.

*To all whom it may concern:*

Be it known that we, ROBERT H. SHEPPE, HUGH H. EATON, and CLIFFORD D. ALLEN, citizens of the United States, and residents, respectively, of Big Stone Gap, in the county of Wise and State of Virginia, of Bristol, in the county of Washington and State of Virginia, and of Meadowview, in the county of Washington and State of Virginia, have invented a new and Improved Automatic Cloth-Measuring and Price-Calculating Machine, of which the following is a full, clear, and exact description.

This invention relates to a new and improved device for measuring the number of yards of cloth sold, and at the same time calculating the toal cost of the same.

An object of this invention is to provide a device which will be simple in construction, inexpensive to manufacture, strong, durable, and simple, automatic and accurate in its operation.

A further object of this invention is to provide a device in which any number of yards of cloth, within reasonable limits, can be automatically registered, and the price thereof simultaneously exposed to view, with means for automatically returning the device to its original position.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a top plan view; Fig. 2 is a fragmentary longitudinal vertical section; Fig. 3 is a transverse vertical section; Fig. 4 is a transverse vertical section, looking in the direction opposite to that in Fig. 3, showing the actuating member in its abnormal, depressed position; Fig. 5 is a transverse vertical section similar to Fig. 4, with the actuating member in its normal, raised position; and Fig. 6 is a transverse vertical section showing the automatic spring return mechanism.

Referring more particularly to the separate parts of the device, 1 indicates a support, preferably located beneath the counter, which is adapted to support in any suitable manner, a casing 2, in which is located the mechanism for counting the number of yards and calculatng the price thereof. The casing 2 is provided with a cover 3, secured to the casing or support in any suitable manner, as by means of screws 4, and is provided with an opening 5, closed by a suitable transparent member 6 of any suitable material, such as glass.

Disposed in the casing 2, there is provided a frame 7, which has a pair of upstanding posts 8, in which are provided channel bearings 9. These bearings 9 are open at the sides, so that a shaft 10 for which these bearings are provided, may be inserted from the side. The shaft 10 rotatably supports, intermediate the posts 8, a cylinder 14, which is spaced apart from one of the posts 8 by means of an adjustable collar 11. In order that the shaft 10 may not rotate after once being adjusted, one of the posts 8 is provided with openings, which are adapted to be brought into alinement with openings in the shaft 10, so as to form suitable locking sockets for a locking pin 12. The opposite end of the shaft 10 is held from jumping out of the open-sided bearing by means of a latch 13, which is pivotally secured to one of the posts 8 in any well-known manner, and is adapted to engage the shaft 10 in such a manner as to aid in preventing the rotation thereof.

Secured to the end of the cylinder 14 in any well known manner, as by means of screws 15, there is provided a ratchet gear 16, which is provided with a cavity 17, within which is located a casing 18, secured to the gear 16 in any well known manner, as by being formed integral therewith. Within the casing 18, there is provided a spiral spring 20, which is secured at one end to the casing 18, and at the opposite end to the shaft 10 in any well known manner. It will thus be seen that the coil spring 20 will permit relative movement of the cylinder 14 with respect to the shaft 10, but will tend automatically to return them to their original relative positions. In order to rotate the cylinder 14 relative to the shaft 10, there is provided an actuating member 21, which extends through an opening 22 in the cover 3, and is provided with a key 23 of sufficient extent to form a surface which can be readily engaged by a yard-stick or other measuring device. The actuator 21 extends down into the casing 2, and is slidingly connected to one of the posts 8 by means of a plurality of screws 24, which engage slots 25 in the actuating member 21, and are separated therefrom by any suitable friction-reducing means, such as washers 26.

Secured to the actuating member 21 in any well known manner, as by being formed integral therewith, there is provided a bracket 27, on which is secured a pin 28. The pin 28 is engaged by a spring 29, which is secured in any well known manner to one of the posts 8, as by means of being inset into a socket therein, and further, by means of a fastener 30. Juxtaposed to the spring 29 and pivotally secured to the same post 8 in any well known manner, as by means of a screw 31, there is provided a regulating cam 32, which is adapted to abut against the spring 29 and regulate the tension thereon and also regulate the position of the actuating member 21 with relation to the post 8. The cam 32 is provided with an outwardly-extending finger 33, whereby it may be readily operated, and is also provided with a slot 34, which is engaged by a locking screw 35, whereby the cam 32 may be locked in any adjusted position. The actuating member 21 is also provided with another lug 36, which has secured thereon in any well known manner a pin 37, which engages a slot 38 in a bell crank lever 39. The bell crank lever 39 is pivotally supported intermediate its ends on the same post 8, and pivotally supports in any well known manner, as by means of a pin 40, a pawl 41. The pawl 41 is adapted to engage at its active end with the teeth of the ratchet gear 16, and is provided with a counterweight 42 at its opposite end for the purpose of normally holding it in engagement with the ratchet teeth.

Pivotally supported on the pawl 41, adjacent the active point thereof, there is provided a link 43, which has a slot 44 therein, whereby it engages a pin 45 on a detent 46 in a slidingly pivoted manner. The detent 46 is adapted to engage at its active end 47 with the ratchet gear 16, and is forced into engagement therewith by means of a counterweight 48 at its opposite end, whereby it automatically locks the ratchet gear 16 in any adjusted position.

In order that the cylinder 14 may be prevented from rotating more than a complete revolution, and in order that this cylinder, when urged to return by the spring 20, will come back to a predetermined point, there is provided on the same end of the cylinder to which the ratchet gear 16 is secured, a stop 49, which is secured thereto in any well known manner. The post 8 is provided with a stop-engaging member 50, which projects from the side thereof a sufficient distance to engage with the stop 49, so as to limit the rotation of the cylinder 14 in either direction.

The surface of the cylinder 14, or a suitable shell secured to the cylinder, is divided into spaces 51 by means of lines 52 corresponding to elements of the cylinder, and circular lines 53 extending at right-angles to the lines 52. In the spaces at the extreme left of the cylinder and to the left of the first circular line 52, starting with a space 54, there are inscribed characters, running from one to any suitable limit, such as fifty, which are for the purpose of indicating the number of yards measured at one sale. The plate 6 closing the opening 5 for the cover 3 is divided into spaces of the same width as the spaces on the cylinder 14, and these spaces are arranged in alinement with the spaces on the cylinder 14, and are further designated by suitable numbers which indicate the various prices of different lengths which it may be necessary to measure, in a successively increasing manner extending from left to right. The prices, as given on the drawings, run from one cent to one dollar, with various common intermediate prices, even in fractions of a cent, where it is customary to sell cloth at those prices.

Extending to the right of the numeral 1 inscribed in the space 54 on the cylinder 14, the spaces are successively filled with numerals corresponding to the numerals of the price-list on the glass plate 6. To the right of each of the other spaces, in peripheral alinement with the space 54, there are inscribed in the spaces, numerals corresponding to the product of the numerals in the spaces in peripheral alinement with the space 54 times the price as indicated on the plate 6 corresponding to the space to which this indication is in alinement. That is to say, the characters in elemental alinement are products of the number indicated at the extreme left of the series times the price per yard as indicated on the plate 6 for the corresponding spaces. The cylinder 14 thus forms a combined memory tablet and multiplication or calculating table.

The operation of the device will be readily understood when taken in connection with the above description. The mechanism is located on the support 1 below the counter, where the clerk can readily measure off the goods from a bolt of cloth. The yard-stick is superposed with one end above the key 23, and the goods drawn through and measured with the yard-stick, and at the end of each measurement the key 23 is depressed by the yard-stick or by any other suitable means, so that it advances the ratchet gear 16 one tooth, which corresponds to one of the spaces on the cylinder 14, at the same time winding up the spring 20. The yard-stick itself, however, may be done away with, and a mark one yard from the center of the key indicated in any suitable manner on the counter, and then the machine can be used by drawing the cloth through the hands, touching the mark with the right hand, and the key with the left hand, then shifting the right hand, grasping onto the cloth at the point where the left hand had held it, and again placing the right hand on the mark and the left hand on the key, depressing the key and recording the measured yards. There will thus be brought up successively the number of yards as measured off from the bolt of goods, and they will appear in juxtaposition to the opening 5 in the cover 3, where they can readily be seen by the clerk. When the exact number of yards has been measured off which the customer desires, the clerk can, by referring to the price-list on the plate 6, and the price indicated on the cylinder in juxtaposition to this price-list, determine the total cost of that number of yards at that particular price.

Inasmuch as the mechanism positively registers each time it is operated, the clerk does not have to depend on his memory to tell how many yards he has measured off. After the sale of goods, when it is desired to return the mechanism to its original position with the space 54 containing the numeral 1 in juxtaposition to the transparent plate 6, the key 23 is raised above its normal, raised position, thereby drawing up the actuating member 21, thus releasing both of the pawls 41 and 46 from engagement with the ratchet gear 16, thereby permitting the spring 20 to uncoil, rotating the cylinder 14 and returning it to its original position. Inasmuch as the cylinder 14 is provided with a stop 49, the exact location of the cylinder on its return will be obtained. A bell can be connected up to the mechanism so as to sound as each yard is registered.

By adjusting the tension on the spring 29 with the aid of the cam-adjuster 32, the force with which the pawl 41 and the detent 46 engages the ratchet gear 16 can be varied, thereby varying the ease with which the mechanism operates. While we have shown one embodiment of our invention, we do not wish to be limited to the specific details disclosed herein, but desire to be protected in various changes and modifications which we may make within the scope of the appended claims.

Having thus described our invention, we claim as new and desire to secure by Letters Patent:—

1. In a device of the class described, the combination with a support, of a cylinder rotatably connected to said support and having characters inscribed thereon, a ratchet gear secured to said cylinder, an actuating pawl engaging said ratchet gear, an actuating member adapted to operate said pawl, a detent for said ratchet gear, a spring for holding said actuating member in a normal mid position and adapted to permit a movement of said actuating member to either side of said normal mid position, the movement of said actuating member in one direction advancing said cylinder, and in the other direction releasing said cylinder, and means for regulating the tension on said spring.

2. In a device of the class described, the combination with a support, of a cylinder rotatably connected to said support and having characters inscribed thereon, a ratchet gear secured to said cylinder, an actuating pawl engaging said ratchet gear, an actuating member adapted to operate said pawl, a detent for said ratchet gear, a spring for holding said actuating member in a normal mid position and adapted to permit a movement of said actuating member to either side of said normal mid position, the movement of said actuating member in one direction advancing said cylinder, and in the other direction releasing said cylinder, and means for regulating the tension on said spring, comprising a cam arranged in juxtaposition to said spring and adapted to place said spring under tension.

3. In a device of the class described, the combination with a support, of a shaft connected to said support, a cylinder rotatably secured to said shaft and having characters thereon, a ratchet gear secured to said cylinder, a pawl engaging said ratchet gear and adapted to rotate the same, an actuating member adapted to operate said pawl, a spring adapted to hold said actuating member in a normal mid position, a detent for said ratchet gear, and a spring secured to said shaft at one end and to said ratchet gear at its other end, the movement of said actuating member in one direction advancing said cylinder, and in the other direction releasing said cylinder.

4. In a device of the class described, the combination with a support, of a shaft connected to said support, a cylinder rotatably secured to said shaft and having characters thereon, a ratchet gear secured to said cylinder, a pawl engaging said ratchet gear and adapted to rotate the same, an actuating member adapted to operate said pawl, a spring adapted to hold said actuating member in a normal mid position, a detent for said ratchet gear, a spring secured to said shaft at one end and to said ratchet gear at its other end, and a cam for regulating the tension on said first-mentioned spring, the movement of said actuating member in one direction advancing said cylinder, and in the other direction releasing said cylinder.

5. In a device of the class described, the combination with a casing, of a cover for said casing having an opening therein, a closure for said opening having characters inscribed thereon, a shaft connected to said casing, a cylinder rotatably supported on said shaft and having characters thereon adapted to be brought into juxtaposition with said characters on said closure, an actuator for said cylinder, having a portion thereof extending above said cover and adapted to be moved to either side of a normal mid position, and a spring secured to said shaft at one end and to said cylinder at the other end and adapted to return said cylinder to its original position.

6. In a device of the class described, the combination with a rotatable cylinder having characters inscribed thereon, of a ratchet gear secured to said cylinder, a pawl engaging said ratchet gear to advance the same, a detent for said ratchet gear, an actuator adapted to operate said pawl to advance said cylinder by a movement in one direction, and means for returning said ratchet gear to its original position, said actuator being adapted to release said pawl and said detent simultaneously by a movement in another direction.

7. In a device of the class described, the combination with a support, of a cylinder rotatably connected to said support and having characters inscribed thereon, a ratchet gear secured to said cylinder, an actuating pawl engaging said ratchet gear, an actuating member adapted to operate said pawl, a detent for said ratchet gear, and a spring for holding said actuating member in a normal mid position, adapted to permit movement of said actuating member to either side of said normal mid position, the movement of said actuating member in one direction advancing said cylinder, and in the other direction releasing said cylinder.

In testimony whereof we have signed our names to this specification in the presence of the subscribing witnesses.

ROBERT H. SHEPPE.
HUGH H. EATON.
CLIFFORD D. ALLEN.

Witnesses to the signature of Robert H. Sheppe:
WALTER C. NOELL,
M. B. CANTER.

Witnesses to the signatures of Hugh H. Eaton and Clifford D. Allen:
C. F. HOGAN,
R. W. KELLY.

Copies of this patent may be obtained for five cents each, by addressing the "Commissioner of Patents, Washington, D. C."